United States Patent [19]
Konno

[11] Patent Number: 5,065,385
[45] Date of Patent: Nov. 12, 1991

[54] TIME BASE CONTROL SYSTEM WITH COARSE AND FINE CORRECTION FOR A SPINDLE SERVO

[75] Inventor: Yoshikiyo Konno, Tokorozawa, Japan

[73] Assignee: Pioneer Electronic Corporation, Tokyo, Japan

[21] Appl. No.: 372,759

[22] Filed: Jun. 29, 1989

[30] Foreign Application Priority Data

Jan. 13, 1989 [JP] Japan ................................ 1-6265

[51] Int. Cl.⁵ ........................ G11B 5/09; H04N 9/89
[52] U.S. Cl. ............................... 369/50; 369/47; 369/44.25; 358/322; 358/338
[58] Field of Search ............... 358/320, 321, 322, 323, 358/328, 338, 339, 340, 50; 360/362; 369/44.25, 44.35, 44.36, 44.34, 59, 60

[56] References Cited

U.S. PATENT DOCUMENTS

| | | | |
|---|---|---|---|
| 4,688,081 | 8/1987 | Furuhata | 358/337 X |
| 4,746,996 | 5/1988 | Furuhata | 360/36.2 X |
| 4,814,897 | 3/1989 | Kojima | 358/338 X |
| 4,825,137 | 4/1989 | Nakajima | 369/44.28 X |
| 4,835,623 | 5/1989 | Okano | 358/338 X |
| 4,853,914 | 8/1989 | Okano | 358/322 X |

*Primary Examiner*—Roy N. Envall, Jr.
*Assistant Examiner*—Hung H. Bui
*Attorney, Agent, or Firm*—Wegner, Cantor, Mueller & Player

[57] ABSTRACT

An apparatus for reading information performing a coarse adjustment of the time base by means of a phase difference between a reproduced sync signal obtained from a read signal read from a recording medium and a reference sync signal and performing a fine adjustment of the time base by writing data obtained by sampling the read signal according to a write clock signal being obtained based on the reproduced sync signal into a memory sequentially from a predetermined address according to a write count starting signal being in synchronism with the reproduced sync signal, and subsequently, reading out the data sequentially from the predetermined address according to a read count starting signal being in synchronism with a spindle reference signal whose phase is changed according to a jump command, in which it is adapted such that, when the time interval between generation of either one of the write count starting signal and the read count starting signal and generation of the other one becomes less than a predetermined period, the phase of the reference sync signal is adjusted to have a predetermined phase difference with the phase of the spindle reference signal.

3 Claims, 4 Drawing Sheets

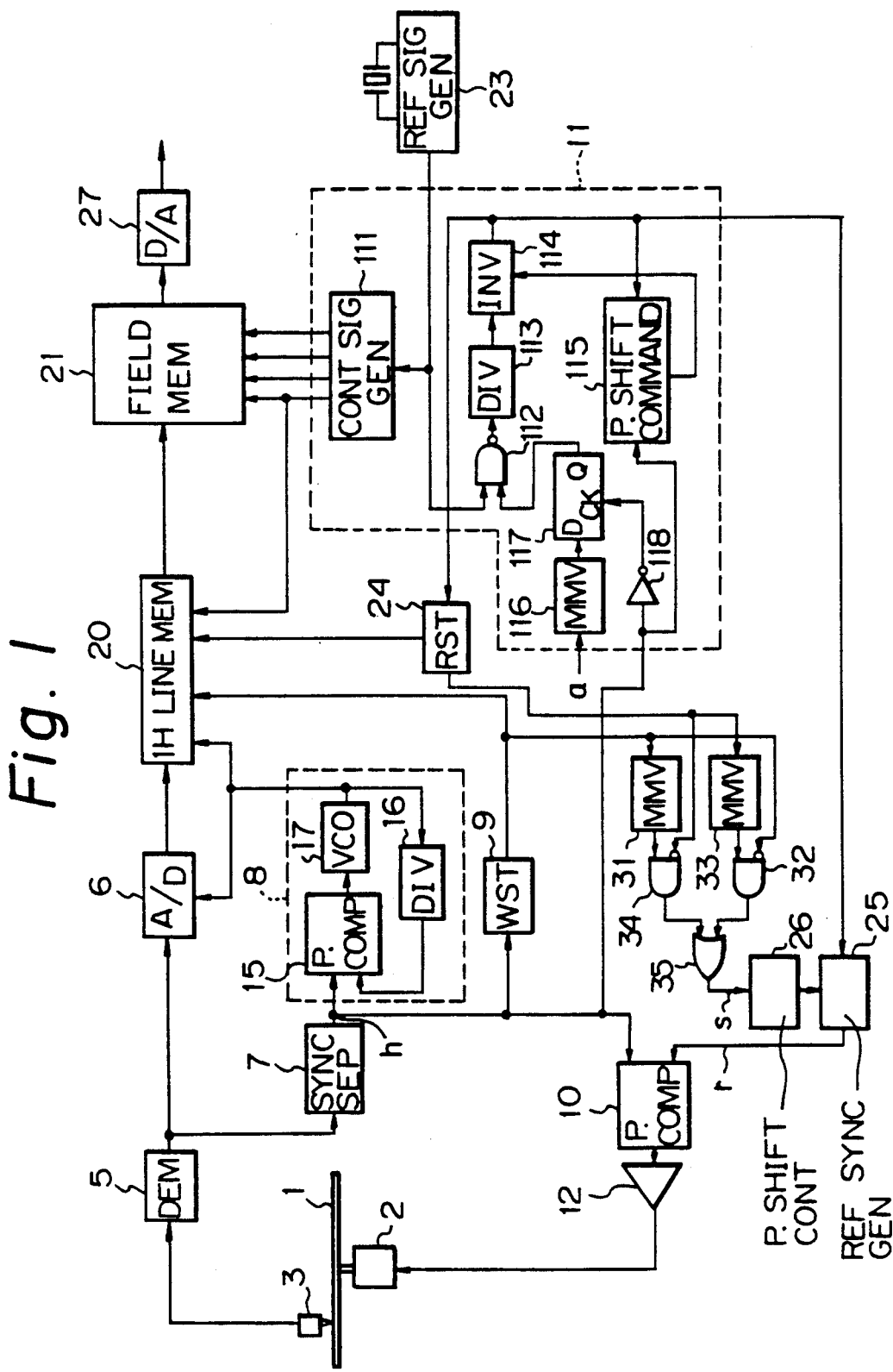

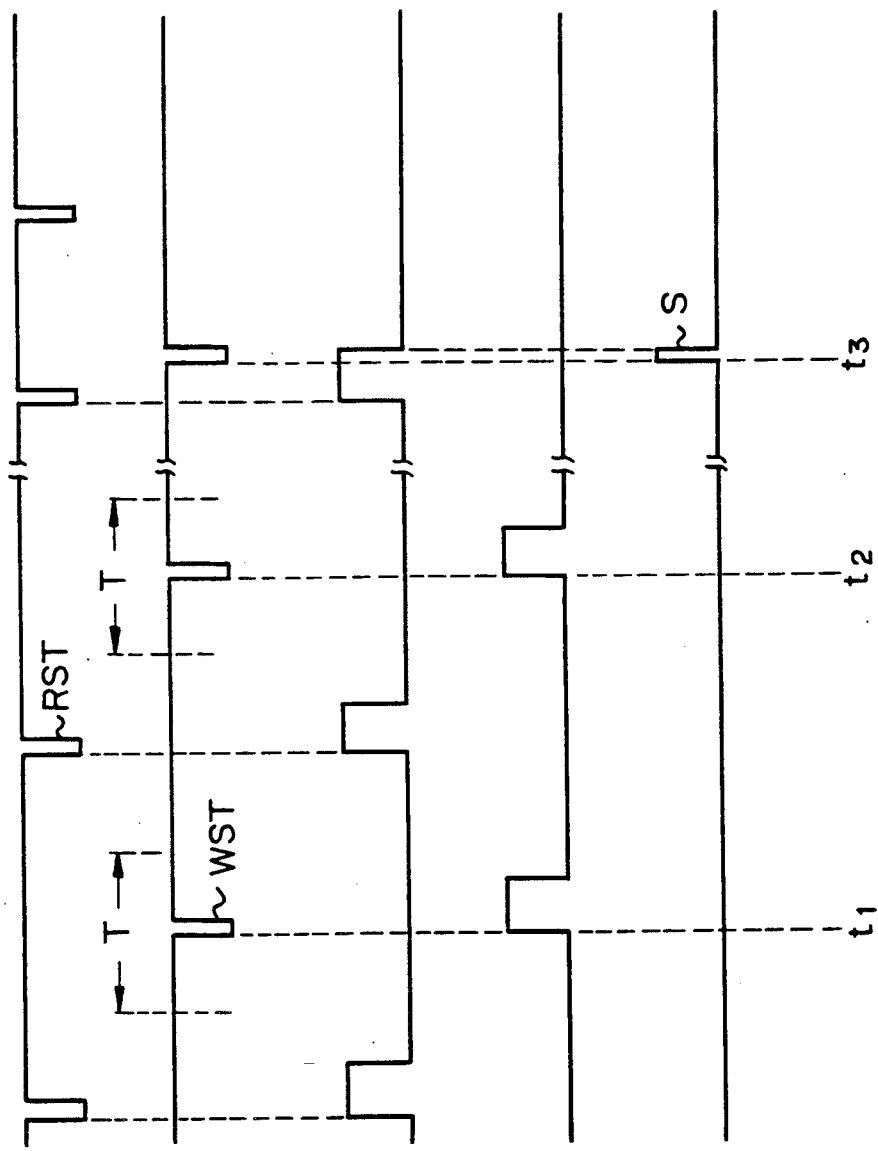

5,065,385

TIME BASE CONTROL SYSTEM WITH COARSE AND FINE CORRECTION FOR A SPINDLE SERVO

BACKGROUND OF THE INVENTION

1. Field of the Invention

The present invention relates to an apparatus for reading information such as a video signal or an audio signal recorded in a recording medium such as a disk or a magnetic tape.

2. Description of the Prior Art

In a video disk player, for example, a coarse adjustment of the time base is performed by regulating the rotating speed of the spindle motor for rotating the disk such that the relative speed between the disk and the information detecting point of the pickup as the signal reading means is controlled and a fine adjustment of the time base is performed by supplying a playback signal obtained by the pickup to a variable delay element and regulating the delay time of the playback signal. As the variable delay element for the fine adjustments of the time base, a memory has come to be used more frequently. In the case where the memory is used, a pulse train signal in synchronism with the variation along the time base in the playback signal is generated and the playback signal is written into the memory according to the pulse train signal, and subsequently, the signal is read out from the memory according to a reference pulse signal having a fixed frequency, whereby the playback signal is delayed a period of time corresponding to the variation along the time base and the fine adjustment of the time base is achieved.

Such a prior art video disk player is shown in FIG. 3. Referring to the figure, a disk 1 is driven to rotate by a spindle motor 2. As the disk 1 is rotated, a signal recorded in the disk 1 is read out by a pickup 3. An RF signal output from the pickup 3 is supplied to a demodulation circuit 5 comprising an FM modulator or the like. A video signal is demodulated by the demodulation circuit 5 and the video signal is supplied to an A/D (Analog to Digital) converter 6 and a sync separation circuit 7. In the sync separation circuit 7, a horizontal sync signal included in the video signal is separated and output as a reproduced horizontal sync signal h. The reproduced horizontal sync signal h is supplied to a write clock generating circuit 8, a write address count starting signal generating circuit 9, a phase comparator circuit 10, and a memory controller 11.

The write address count starting signal generating circuit 9 comprises, for example, a differentiation circuit and is adapted to output a write address count starting signal (hereinafter to be called "WST signal") formed of a pulse of negative polarity generated in synchronism with the reproduced horizontal sync signal h.

In the phase comparator circuit 10, the reproduced horizontal sync signal h is compared with a reference horizontal sync signal r, and thereby, a signal corresponding to the phase difference between these signals is generated. The output of the phase comparator circuit 10 is supplied as a spindle error signal to the spindle motor 2 through a servo amplifier 12 so that the rotating speed of the disk 1 is controlled.

In the write clock generating circuit 8, the reproduced horizontal sync signal h is supplied to the phase comparator circuit 15 to be compared with an output of a frequency divider 16, and thereby, a phase difference signal corresponding to the phase difference between these signals is generated. The output of this phase comparator circuit 15 serves as the control input for a VCO (Voltage Controlled Oscillator) 17. The VCO 17 is arranged such that its free-running frequency is virtually equal to four times the frequency $f_{sc}$ of the color subcarrier. The output of the VCO 17 is supplied to the frequency divider 16 and its frequency is divided therein, for example, by 910. The phase comparator circuit 15, VCO 17, and the frequency divider 16 together form a PLL (Phase Locked Loop), and from the VCO 17, a signal in phase with the reproduced horizontal sync signal h is output. The output of the VCO 17 is supplied to a 1-H line memory 20 as a write clock and also supplied to the A/D converter 6 as a sampling pulse.

In the A/D converter 6, the video signal is subjected to sampling with the use of the output of the VCO 17, whereby digital data corresponding to the obtained sample values is generated. The output data from the A/D converter 6 is supplied to the 1-H line memory 20. To the 1-H line memory 20 are supplied, other than the write clock, the WST signal, a read address count starting signal (hereinafter to be called "RST signal"), and a read clock. The 1-H line memory 20 comprises, for example, a memory having a capacity capable of storing data for one line, a write address counter which is reset by the WST signal and the count value of which is sequentially changed by the write clock, and a read address counter which is reset by the RST signal and the count value of which is sequentially changed by the read clock. The 1-H line memory 20 is adapted, every time the write clock is generated, to write the input data into the memory at the address indicated by the output data of the write address counter, and every time the read clock is generated, to read and output the data written in the memory at the address indicated by the output data of the read address counter. By this 1-H line memory 20, the fine adjustment of the time base is performed.

The data read out of the 1-H line memory 20 is supplied to the field memory 21. The field memory 21 is structured, for example, the same as the line memory 20, except for the storage capacity. The field memory 21 is supplied with various controlling signals from the memory controller 11. The memory controller 11 is supplied with an output of a reference signal generating circuit 23, which is composed of such parts as a quartz oscillator generating a reference signal whose frequency is four times the frequency of the subcarrier, i.e., 4 $f_{sc}$. In the memory controller 11, the reference signal of the frequency of 4 $f_{sc}$ is supplied to a control signal generating circuit 111 and also serves as one of the inputs to a NAND (nonconjunction) gate 112. The control signal generating circuit 111 is arranged to generate various control signals by means of the reference signal of 4 $f_{sc}$ and supply these signals to the field memory 21, so that input data are written into the field memory 21 sequentially from a predetermined address and the written data are read out sequentially in the order according to an operating mode designated by an operating unit (not shown).

Meanwhile, the reference signal of 4 $f_{sc}$ passed through the NAND gate 112 is supplied to a frequency divider 113 and its frequency is divided therein by 910. The frequency divider 113 is formed, for example, of a divide-by-910 counter and arranged to output a signal corresponding to the most significant digit of the count value. The output of this frequency divider 113 is supplied to a switching inverter circuit 114. The switching inverter circuit 114 is adapted to alternately deliver the output of the frequency divider 113 and the signal obtained by inverting the output of the frequency divider 113 every time, for example, a phase shift command is issued. More particularly, at every issuance of the phase shift command, the output of the switching inverter circuit 114 is inverted so that its phase is shifted by $\pi$. The switching inverter circuit 114 is constructed, for example, as shown in FIG. 3B of a switch 201 alternatively relaying the input signal to and the output signal from an inverted 200 and a flip-flop 202 triggered by the phase shift command from the phase shift command generating circuit 115 so as to set on or off the switch 201. The output of the switching inverter circuit 114 is supplied to various parts as a spindle reference signal. Thus, as long as a signal of a logical "1" is supplied to the other input terminal of the NAND gate 112, the reference signal is supplied to the frequency divider 113, so that the spindle reference signal of a predetermined frequency is generated.

On the other hand, a monostable multivibrator 116 is triggered by the leading edge of a jump command pulse a, which is generated in a special playback mode such as scan, still picture playback, and double-speed playback, and generates a single pulse with a predetermined width of negative polarity. The pulse width of the single pulse of negative polarity is set to be longer than the period required for the information detecting point of the pickup 3 to make one track jump operation. This single pulse of negative polarity is supplied to the D input terminal of a D flip-flop 117. To the clock input terminal CK of the D flip-flop 117 is supplied the reproduced horizontal sync signal h through an inverter 118. The Q output of the D flip-flop 117 is supplied to the other input terminal of the NAND gate 112.

Thus, when the reproduced horizontal sync signal h is generated for the first time after the jump command pulse a has been generated, the D flip-flop 117 is reset and the counting operation of the frequency divider 113 is stopped. The D flip-flop 117 is set by the reproduced horizontal sync signal h incoming for the first time after the single pulse as the output of the monostable multivibrator 116 has decayed, and thereby, the counting operation of the frequency divider 113 is started again. Since the ouput of the frequency divider 113 passed through the switching inverter circuit 114 becomes the spindle reference signal, the phase of the spindle reference signal relative to the reproduced horizontal sync signal h immediately after the jump operation changes and comes into agreement with the phase of the same relative to the reproduced horizontal sync signal h immediately before the jump operation. Since the RST signal is generated in synchronism with the spindle reference signal as described later and the WST signal is generated in synchronism with the reproduced horizontal sync signal h, the time difference between the RST signal and WST signal immediately after the jump comes into agreement with the time difference between the RST signal and WST signal immediately before the jump.

The spindle reference signal, together with the reproduced horizontal sync signal h, is supplied to the shift command generating circuit 115. The shift command generating circuit 115 is adapted to detect, by means of the spindle reference signal and the reproduced horizontal sync signal h, that either one of the WST signal and the RST signal, after it was once generated, has been generated again before the other one is generated, to thereby generate the phase shift command signal.

The spindle reference signal generated in the memory controller 11 is supplied to an RST signal generating circuit 24 and a reference sync signal generating circuit 25. The RST signal generating circuit 24 is formed, for example, of a differentiation circuit and adapted to output the RST signal in synchronism with the trailing edge of the spindle reference signal.

The phase shift command signal output from the memory controller 11 is supplied to a phase shift controlling circuit 26. The phase shift controlling circuit 26 is arranged to output an acquisition operation command signal, for example, extending over the time equal to the period of the spindle reference signal from when the phase shift command signal has been generated. The output of the phase shift controlling circuit 26 is supplied to the reference sync signal generating circuit 25. The reference sync signal generating circuit 25 is adapted to take in the spindle reference signal while the acquisition operation command signal is supplied and output it as the reference horizontal sync signal r. As the reference sync signal generating circuit 25, such a circuit can be used which is made up, for example, of a divide-by-910 counter which counts up upon receipt of the 4 $f_{sc}$ reference signal and outputs a signal corresponding to the most significant bit of the count value data as the reference horizontal sync signal r and others and adapted such that the count value is reset in response to the trailing edge of the spindle reference signal, while the acquisition operation command signal is output from the phase shift controlling circuit 26.

On the other hand, data read out from the field memory 21 is supplied to the D/A converter 27 and converted into an analog signal. From this D/A converter is output a playback video signal.

With the above described construction, during a normal playing operation, the allowance for jitter in the playback video signal becomes maximum when there is a time difference of 1H/2 ($\approx$32 $\mu$s) on an average between the WST signal obtained from the reproduced horizontal sync signal h and the RST signal output from the RST signal generating circuit 24. Because of this, it is arranged such that, after the spindle reference signal in synchronism with the RST signal is taken in as the reference horizontal sync signal r, the spindle error signal corresponding to the phase difference between the reference horizontal sync signal r and the reproduced horizontal sync signal h is generated in the phase comparator circuit 10, whereby the rotating speed of the spindle motor 2 is controlled so that the time difference between the WST signal and the RST signal may become 1H/2 on an average.

When a jump operation is performed in the described apparatus during its reading operation of the recorded information with a CLV (constant linear velocity) disk, the reproduced horizontal sync signal h becomes discontinuous and its period is disturbed so that a phase difference is produced between the spindle reference signal and the reference horizontal sync signal r. Then, the time deference between the WST signal and the RST signal is disturbed, so that the timing of the generation of the WST signal is advanced or delayed with reference to the RST signal. However, it is arranged such that, if either one of the WST signal and the RST signal was once generated and then the same signal has been generated again before the other one is generated, the spindle reference signal output from the memory controller 11 is inverted and, at the same time, the phase shift command signal is output, whereby the inverted spindle reference signal is taken in as the reference horizontal sync signal r and the time difference between the WST signal and the RST signal becomes equal to 1H/2 again.

However, the phase shift command signal is output in the above described prior art apparatus only when, after either one of the WST signal and the RST signal was generated, the same signal has been generated again before the other one is generated, and therefore, there has been such a problem, for example, that the information at an address once read is read again before it is altered so that the same image is played back during two horizontal periods.

SUMMARY OF THE INVENTION

The present invention was made in view of the above mentioned problem and an object of the present invention is to provide an apparatus for reading information which is capable of preventing an error of forming the same image along two successive horizontal lines on the monitor.

The apparatus for reading information according to the present invention, performing a coarse adjustment of the time base by means of a phase difference between a reproduced sync signal obtained from a read signal and a reference sync signal and performing a fine adjustment of the time base by writing data obtained by sampling the read signal according to a write clock signal being obtained based on the reproduced sync signal into a memory sequentially from a predetermined address according to a WST signal being in synchronism with the reproduced sync signal, and subsequently, reading out the data sequentially from the predetermined address according to an RST signal being in synchronism with a spindle reference signal whose phase is changed according to a jump command, is adapted such that, when the time interval between generation of either one of the WST signal and the RST signal and generation of the other one becomes less than a predetermined period, the phase of the reference sync signal is adjusted to have a predetermined relationship to the phase of the spindle reference signal.

BRIEF DESCRIPTION OF THE DRAWINGS

FIG. 1 is a block diagram showing an embodiment of the present invention;

FIG. 2A through FIG. 2E are timing charts showing operations of various parts in FIG. 1.

DETAILED DESCRIPTION OF A PREFERRED EMBODIMENT

An embodiment of the present invention will be described below in detail with reference to FIG. 1 and FIG. 2.

Figure 3A:
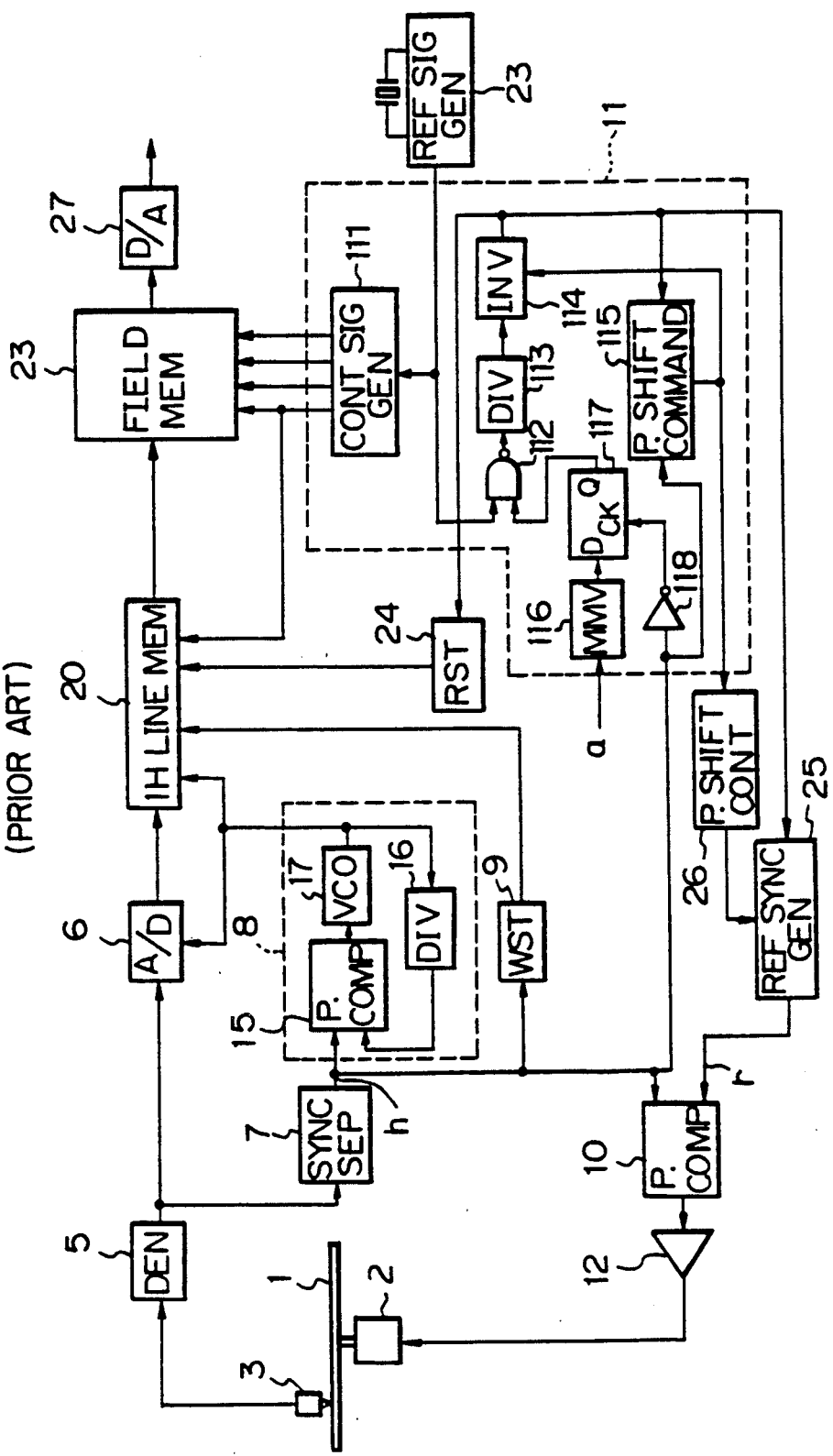
FIG. 3A and FIG. 3B are block diagrams showing a prior art apparatus for reading information.
Figure 3B:
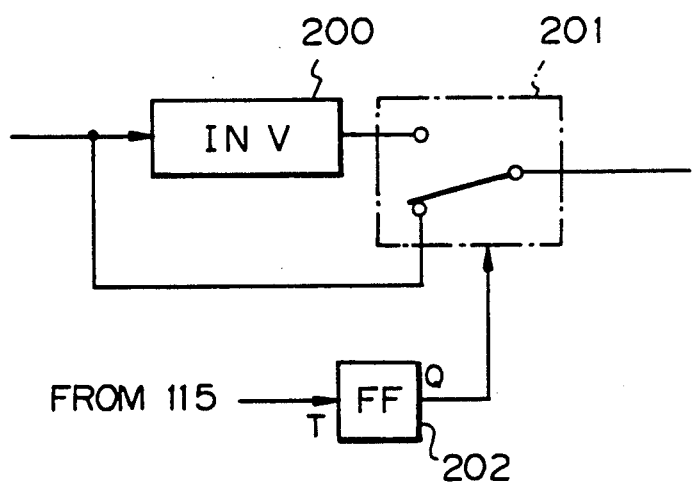

As shown in FIG. 1, the disk 1, spindle motor 2, pickup 3, demodulator circuit 5, A/D converter 6, sync separation circuit 7, write clock generating circuit 8, WST signal generating circuit 9, phase comparator circuit 10, memory controller 11, servo amplifier 12, 1-H line memory 20, field memory 21, reference signal generating circuit 23, RST signal generating circuit 24, reference sync signal generating circuit 25, phase shift controlling circuit 26, and the D/A converter 27 are connected the same as those in the apparatus of FIG. 3.

However, in the present embodiment, the WST signal is supplied to the trigger input terminal of a monostable multivibrator 31 and one input terminal of a gate circuit 32, while the RST signal is supplied to the trigger input terminal of a monostable multivibrator 33 and one input terminal of a gate circuit 34. The monostable multivibrators 31 and 33 are arranged such that their inverted time remaining in the quasi-stable state is approximately 10 μs. The Q outputs of the monostable multivibrators 31 and 33 are respectively supplied to the other input terminals of the gate circuits 34 and 32. The gate circuits 32 and 34 are each arranged to output a signal corresponding to a logical product of the signal supplied to one input terminal and the inverted signal of the signal supplied to the other input terminal. A pulse of positive polarity output from the gate circuit 32, 34 is supplied through a logical sum circuit 35 to the phase shift controlling circuit 26 as a phase shift command signal s.

Operations in various parts of the described arrangement will be described below with reference to FIG. 2. Referring to FIG. 2, FIG. 2A and FIG. 2B respectively show timing of generation of the RST signal and the WST signal, FIG. 2D and FIG. 2C respectively show timing of inversion of the Q outputs of the monostable multivibrators 31 and 33, and FIG. 2E shows timing of generation of the phase shift command signal s.

A jitter in the playback video signal output from the demodulator circuit 5 becomes approximately 30 μs at the maximum due to eccentricity of the disk 1. The WST signal synchronized with the reproduced horizontal sync signal, in contrast to the RST signal generated at intervals of a predetermined period in synchronism with the spindle reference signal, is possible to be generated at any timing within the jitter range T as shown in FIG. 2B. However, when the spindle reference signal and the reference horizontal sync signal r are in phase, the time difference between the WST signal and the RST signal becomes the value corresponding to the phase difference between the reproduced horizontal sync signal h and the reference horizontal sync signal r, namely, 1H/2 (at time $t_1$, $t_2$), on an average, and hence, the time difference between the WST signal and the RST signal does not become below 10 μs so that the phase shift command signal s is not generated. But, by a jump operation in such a mode as a scanning mode performed in the apparatus while reading the recorded information with a CLV disk, the reproduced horizontal sync signal h becomes discontinuous so that the period of the reproduced horizontal sync signal h is disturbed, and thereby, a phase difference is produced between the spindle reference signal and the reference horizontal sync signal r. Then, the time difference between the WST signal in synchronism with the reproduced horizontal sync signal h and the RST signal in synchronism with the spindle reference signal is disturbed. At this time, if, for example, the WST signal is generated within 10 μs after the generation of the RST signal (time $t_3$), since the Q output of the monostable multivibrator 33 is at a high level at this time $t_3$, the WST signal is output as a phase shift command signal s through the gate circuit 32 and the logical sum circuit 35. Then, the spindle reference signal is taken in by the reference sync signal generating circuit 25 as a reference horizontal sync signal r bringing the phase of the reference horizontal sync signal r into agreement with the phase of the spindle reference signal, whereby the average value of the time difference between the WST signal and the RST signal becomes the value corresponding to the phase difference between the reproduced horizontal sync signal h and the reference horizontal sync signal r (i.e. 1H/2), and thus, double reading of the data in the 1-H line memory 20 can be prevented.

Although the inverted period of the monostable multivibrators 31 and 33 was set to 10 μs in the above embodiment, the inverted period of the monostable multivibrators 31 and 33 may be adjusted within the limit not exceeding 15 μs, and therefore, it is preferred to have the time set according to such conditions as the allowance for the jitter in the playback video signal.

As described above in detail, the apparatus for reading information according to the present invention, performing a coarse adjustment of the time by means of a phase difference between the reproduced sync signal obtained from the read signal and the reference sync signal and performing a fine adjustment of the time base by writing data obtained by sampling the read signal according to the write clock signal being obtained based on the reproduced sync signal into a memory sequentially from a predetermined address according to the WST signal being in synchronism with the reproduced sync signal, and subsequently, reading out the data sequentially from the predetermined address according to the RST signal being in synchronism with the spindle reference signal whose phase is changed according to a jump command, is adapted such that, when the time interval between generation of either one of the WST signal and the RST signal and generation of the other one becomes less than a predetermined period, the reference sync signal is adjusted to have a predetermined phase difference with the spindle reference signal. Therefore, in the apparatus for reading information according to the present invention, when the time interval between generation of either one of the WST signal and the RST signal and generation of the other one becomes less than a predetermined period due to, for example, its performing a jump operation while reading recorded information in a CLV disk, the phase of the reproduced sync signal with respect to the reference sync signal and the phase of the reproduced sync signal with respect to the spindle reference signal are adjusted to have a predetermined relationship with each other, and thereby, the average value of the time difference between the WST signal in synchronism with the reproduced sync signal and the RST signal in synchronism with the spindle reference signal becomes the value corresponding to the phase difference between the reproduced sync signal and the reference sync signal, i.e., 1H/2. As a result, in the apparatus for reading information according to the present invention, occurrence of such a thing that, after either one of the WST signal and the RST signal was once generated, the same signal is generated again before the other one is generated is prevented, and therefore, it never occurs that information once read at an address in the memory for fine adjustment of the time base is read again before it is altered leading to playback of the same image during two successive horizontal periods.

What is claimed is:

1. A disc player for reading information from a recording disc, comprising:

signal reading means for reading a signal recorded on said recording disc and generating a read signal representative thereof, spindle reference signal generating means for generating a spindle reference signal whose phase is changed in response to a jump command, reference sync signal generating means for generating a reference sync signal having a predetermined frequency, spindle servo control means for controlling a spindle servo to perform a coarse adjustment of a time base of said read signal on the basis of a phase difference between a reproduced sync signal obtained from said read signal and said reference sync signal, fine adjustment means for performing a fine adjustment of the time base by writing a data signal, which is obtained by sampling said read signal according to a write clock signal obtained on the basis of said reproduced sync signal, into a memory sequentially in synchronism with said reproduced sync signal, starting from a predetermined address in response to a write address count starting signal in synchronism with said reproduced sync signal, and subsequently by reading the data sequentially from said memory in synchronism with said spindle reference signal while starting from said predetermined address in response to a read address count starting signal, and phase shift command issuance means for issuing a phase shift command when a difference in timing between said address count starting signal and said read address count starting signal is smaller than a predetermined time period, wherein said reference sync signal generating means, responding to said phase shift command, shifts, the phase of said reference sync signal so that said reference sync signal has a predetermined phase difference with said spindle reference signal.

2. The apparatus for reading information according to claim 1, wherein said predetermined phase difference is zero.

3. The disc player according to claim 1, wherein said phase shift command issuance means comprises a first monostable multivibrator triggered by one of said write address count starting signal and said read address count starting signal for delivering an output corresponding to a first quasi-stable state, a second monostable multivibrator triggered by the other one of said write address count a starting signal and said real address count starting signal for delivering an output corresponding to a second quasi-stable state, and a phase control circuit for issuing a phase shift command when said other one appears during the first quasi-stable state, or when said one appears during the second quasi-stable state.

* * * * *